(12) United States Patent
Krogh et al.

(10) Patent No.: US 8,161,693 B2
(45) Date of Patent: Apr. 24, 2012

(54) METHOD AND ARRANGEMENT TO INSTALL A WIND-TURBINE

(75) Inventors: Mikkel Verner Krogh, Brande (DK); Jonas Madsen, Tjæreborg (DK)

(73) Assignee: Siemens Aktiengesellschaft, Munich (DE)

( * ) Notice: Subject to any disclaimer, the term of this patent is extended or adjusted under 35 U.S.C. 154(b) by 178 days.

(21) Appl. No.: 12/712,283

(22) Filed: Feb. 25, 2010

(65) Prior Publication Data
US 2010/0225120 A1 Sep. 9, 2010

(30) Foreign Application Priority Data
Mar. 3, 2009 (EP) ..................................... 09003041

(51) Int. Cl.
*E04B 1/38* (2006.01)
(52) U.S. Cl. .................................... 52/125.2; 52/745.17
(58) Field of Classification Search ......... 52/40, 745.13, 52/745.17, 122.1, 123.1, 116, 120; 29/281.1; 254/4 R
See application file for complete search history.

(56) References Cited

U.S. PATENT DOCUMENTS

| 7,281,902 B2 * | 10/2007 | Mortensen ................ 416/244 R |
| 2007/0151194 A1 * | 7/2007 | Livingston et al. ......... 52/651.05 |
| 2010/0254813 A1 * | 10/2010 | Dawson et al. ........... 416/146 R |

FOREIGN PATENT DOCUMENTS

| EP | 1348867 A1 | 10/2003 |
| EP | 1101936 B1 | 6/2004 |
| EP | 1518053 B1 | 10/2008 |
| WO | WO 2006080850 A1 | 8/2006 |
| WO | WO 2007097640 A2 | 8/2007 |

* cited by examiner

*Primary Examiner* — William Gilbert
*Assistant Examiner* — Beth Stephan

(57) ABSTRACT

At least one blade of the wind-turbine is attached firm but detachable with the tower by a fixture. The tower and the attached blade are transported to a planned site. The tower and the attached blade are brought together into an upright position in a single lift-action. A hub and a nacelle of the wind-turbine are mounted on the top of the tower. A wire of a winch, which is located inside the nacelle or the hub, is connected with a root of the blade. The blade is detached from the tower by unlocking the fixture. The blade is lift up to the hub for its attachment there.

14 Claims, 2 Drawing Sheets

FIG 1
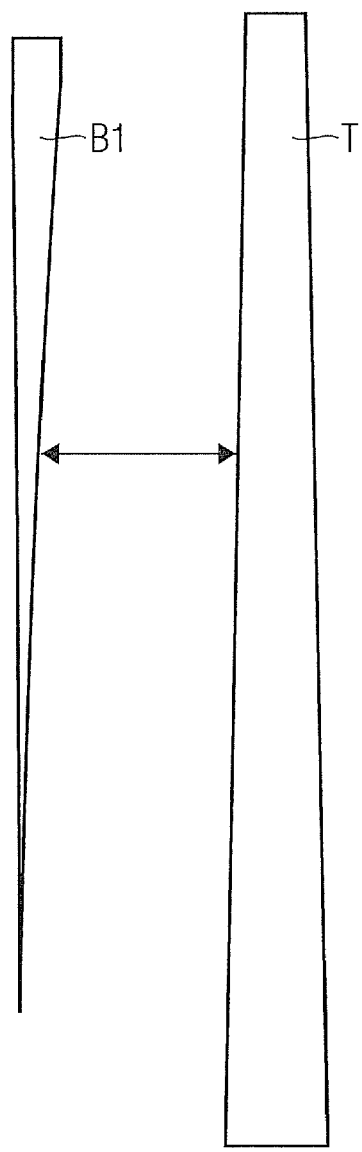
FIG 2A
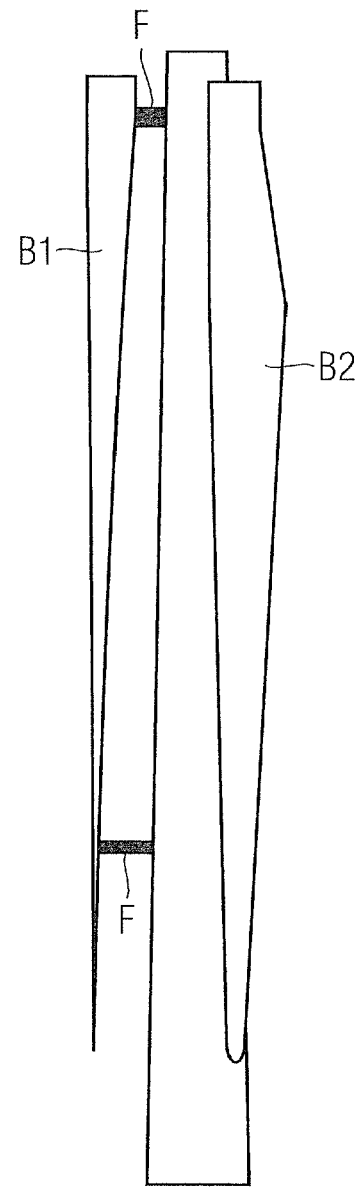
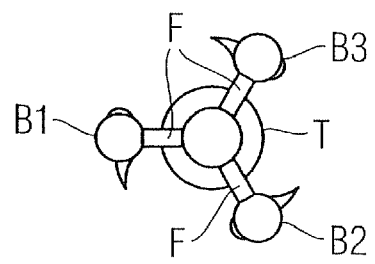
FIG 2B

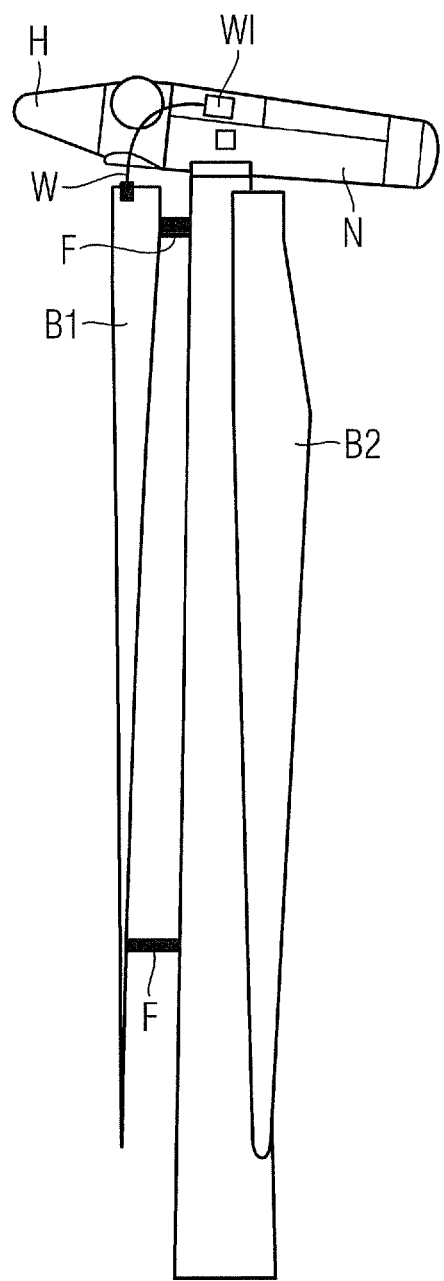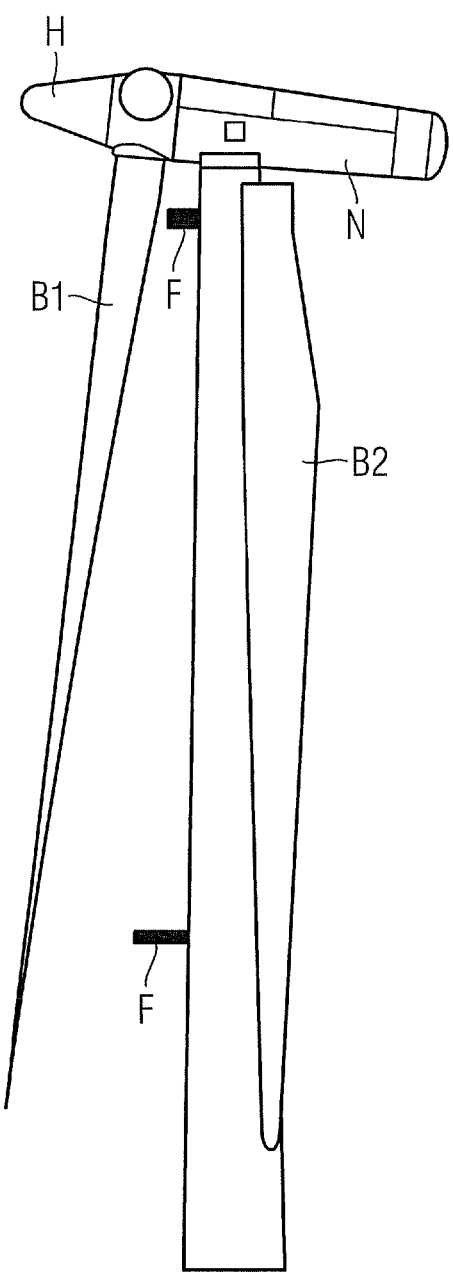

METHOD AND ARRANGEMENT TO INSTALL A WIND-TURBINE

CROSS REFERENCE TO RELATED APPLICATIONS

This application claims priority of European Patent Office application No. 09003041.2 EP filed Mar. 3, 2009, which is incorporated by reference herein in its entirety.

FIELD OF INVENTION

The invention relates to an arrangement and a method to install a wind-turbine, especially at an offshore-site.

BACKGROUND OF INVENTION

An installation of a wind turbine on offshore sites is expensive and time consuming, as the components of the wind-turbine, which are huge and heavy, have to be loaded separately by the help of a huge crane on a ship, have to be transported to the offshore site and have to be mounted there by the help of a ship-crane.

These wind-turbine components comprise especially the tower itself, the blades and the nacelle, where the nacelle is already connected with the hub normally.

If there is bad weather at the offshore-site or if there is a strong wind-situation, it is very difficult to install and mount the wind-turbine components. Especially the large blades, which show a big wind-load while mounting, lead to a difficult installation of the blades to the hub.

The EP 1 518 053 B1 shows a method to install wind-turbine components. A nacelle, tower modules and a jacking-crane are unloaded from a ship at an offshore foundation by help of a ship-crane. The tower modules are installed by help of the jacking crane. Then each blade is unloaded from the ship by help of the ship crane and is handled to the jacking crane on the tower. The blades are installed by lifting each blade up to the nacelle for attachment by the jacking crane. This method is very time-consuming.

The EP 1 101 936 B1 describes a method to install blades to the hub of a wind-turbine by using a winch with a wire. The winch is placed in the nacelle while the wire is going out through the hub and is attached to each of the blades for the installation. This method is also very time-consuming.

SUMMARY OF INVENTION

It is therefore the aim of the invention, to provide an improved method and arrangement to install components of a wind-turbine.

This aim is solved by the features of the independent claims.

Advantageous embodiments of the invention are described within the dependent claims.

According to the invention a wind-turbine is installed. At least one blade of the wind-turbine is attached firmly but detachably at the tower by a fixture.

The tower and the attached blade are transported to a planned site. The tower and the attached blade are brought together into an upright position in a single lift-action. A hub and a nacelle of the wind-turbine are mounted on the top of the tower. A wire of a winch, which is located inside the nacelle or the hub, is connected with a root of the blade. The blade is detached from the tower by unlocking the fixture. The blade is lifted up to the hub for its attachment there.

According to the invention the transportation of the components is cheap and easy, as they are brought together to the site as a number of pre-mounted devices.

Because of the invention it is not longer necessary, to lift the nacelle, the hub and each blade as single components with a number of separate lift-actions.

By help of the invention the transportation and the installation is less time-consuming and is therefore less expensive.

Today it takes approximately one hour to lift a single blade into a ship, for example. This results in needed three hours for this.

The invention allows to reduce this effort, as there is only the need to lift the tower together with the attached blades into the ship, as the blades are already connected with the tower.

By help of the invention the transportation is easier, as space, needed for the fixation of each single blade during the transport before, is saved. The tower itself is used for the blade-fixation during the transport.

In a preferred embodiment a winch is used to connect/to mount the blades to the hub. So no external crane needs to be used for this purpose.

So time and money are saved during the installation, while the installation of huge blades is easier according to the invention. There is no need for a separate crane any more.

According to the invention it is possible to attach one, two or even three blades at the tower by help of fixtures.

The fixtures might be realized as clamp-configuration, as a fastening-configuration, etc. . . . it might comprise any fixture, which allows to hold or attach the blade firmly but detachably at the mast, while the mast is lifted together with the attached blades.

If transport-problems occur (because of a small spacing between the blades) it is also possible to remove one blade during the transportation from the blade-fixture to achieve more space for the fixation of the tower during the transport.

BRIEF DESCRIPTION OF THE DRAWINGS

The invention is described in more detail with help of a drawing now.

FIG. 1, FIG. 2A, FIG. 2B, FIG. 3, and FIG. 4 shows the inventive method to install the main components of a wind-turbine.

DETAILED DESCRIPTION OF INVENTION

Referring to FIG. 1 and FIG. 2B three blades B1, B2, B3 are brought to a tower T of a wind-turbine, to be connected with the tower T by help of a common blade-fixture F.

According to the invention the blades B1, B2, B3 are connected firmly but detachably by a fixture F with the tower T.

The fixture F is remote controlled in a preferred embodiment. For example the fixture F comprises a remote-controlled lock, which may be electromagnetically or mechanically-controlled.

It is also possible to use an electrical motor or a hydraulic motor or a pneumatic motor at the fixture F to lock or unlock the fixture.

It is even possible to use a number of bolts, which are released to unlock the blade if needed.

The fixture is a common fixture for all three blades in a preferred embodiment (not shown here in detail). The common fixture may embrace the tower in a preferred embodiment.

If the tower shows a cross-section of a circle, the fixation is ring-shaped. If the tower shows also a conical shape the ring-shaped-fixture can be brought into a certain position very easily.

As shown here it is also possible to use a number of separated fixtures F, while one, two or more vertically stacked fixtures F are assigned to a certain single blade. This is shown in the top-view of FIG. 2B.

Next steps (not shown here) include the transportation of the tower together with the attached blades to a planned site. At this site the tower is lifted together with the attached blades and is brought into an upright position in a single lift-action.

If the site is an offshore-site a ship crane may be used for this purpose.

The tower with the attached blades is positioned and kept by help of a foundation, which is prepared at the site.

In a preferred embodiment the hub of the wind-turbine is already mounted at the nacelle, so the nacelle and the hub can be transported as a common device to the site. Therefore it is possible to mount them together at the top of the tower in another single lift-action.

If the site is offshore the ship crane can be used for this purpose, too.

Referring to the figures FIG. 3 and FIG. 4 the assembly of the wind-turbine-components is described in more detail.

The nacelle N comprises a winch WI, while the winch WI comprises a wire W to be used for the blade-installation.

It is also possible to locate the winch WI inside the hub H, as it is big enough for this purpose.

The wire W is lowered down by the winch WI and is connected with a root of a first blade B1. Then the first blade B1 is detached from its fixtures F. In a preferred embodiment the fixture is remote-controlled as described above.

The first blade B1 is lifted by the wire W and is winched up to the hub H. The first blade B1 is attached with the hub H.

The hub H and the nacelle are rotated by certain angles and the steps described above are repeated for the blades B2 and B3.

In a preferred embodiment (which is not shown here in detail) the fixtures F themselves are removed from the tower. For this purpose the wire W or the crane, which was used before, are used to lower down the fixtures F to the ground.

The invention claimed is:

1. A method to install a wind-turbine, comprising:
   transporting a blade of the wind-turbine to an installation site, the transported blade is firmly but detachably locked to a tower by a fixture before the transporting;
   lifting the tower together with the attached blade into an upright position in a single lift-action;
   mounting a hub and a nacelle of the wind-turbine on a top of the tower;
   connecting a wire of a winch, which is located inside the nacelle or the hub, with a root of the blade;
   detaching the blade from the tower after connecting the wire, the detaching by unlocking the fixture;
   lifting the detached blade up to the hub via the winch; and
   attaching the lifted blade to the hub.

2. The method according to claim 1, wherein the fixture is remote controlled in order to lock or unlock the blade.

3. The method according to claim 2, wherein the fixture is electro-magnetically or mechanically controlled.

4. The method according to claim 2, wherein the fixture uses an electrical motor or a hydraulic motor or a pneumatic motor to lock or unlock the blade.

5. The method according to claim 1, wherein
   the fixture is a single common fixture which attaches a plurality of blades to the tower.

6. The method according to claim 1, wherein
   a plurality of blades are attached to the tower via a plurality of fixtures.

7. The method according to claim 1, further comprising:
   transporting the hub of the wind-turbine, which is mounted at the nacelle of the wind-turbine before the transportation, to the installation site, wherein
   the mounting the hub and the nacelle on top of the tower is in a single lift-action.

8. The method according to claim 1, further comprising:
   removing the fixture from the tower with the aid of the wire of the winch.

9. An arrangement of a wind-turbine, comprising:
   a wind-turbine blade including a blade root;
   a wind-turbine tower of the wind-turbine;
   a fixture configured to detachably lock the wind-turbine blade to the wind-turbine tower to allow joint transportation to an installation site where the wind-turbine blade and the wind-turbine tower are jointly brought into an upright position by a single lift-action;
   a winch comprising a wire is included in a nacelle or a hub, the wire is configured to lift the wind-turbine blade up to the hub, the wire is configured to connect to the blade root to allow the winch to raise the wind-turbine blade up to the hub.

10. The arrangement according claim 9, wherein the hub and the nacelle are pre-mounted before transportation to the installation site.

11. The arrangement according to claim 9, wherein the fixture is a remote controlled in order to lock or unlock the blade.

12. The arrangement according to claim 11, wherein the fixture is an electro-magnetically or mechanically controlled fixture.

13. The arrangement according to claim 11, wherein the fixture comprises an electrical motor or a hydraulic motor or a pneumatic motor to lock or unlock the blade.

14. The arrangement according claim 10, wherein the pre-mounted hub and nacelle are mounted on top of the tower in a single lift-action.

\* \* \* \* \*